Oct. 6, 1953
H. W. DRYDEN
2,654,169
CHICKEN WING MARKER
Filed Oct. 16, 1948
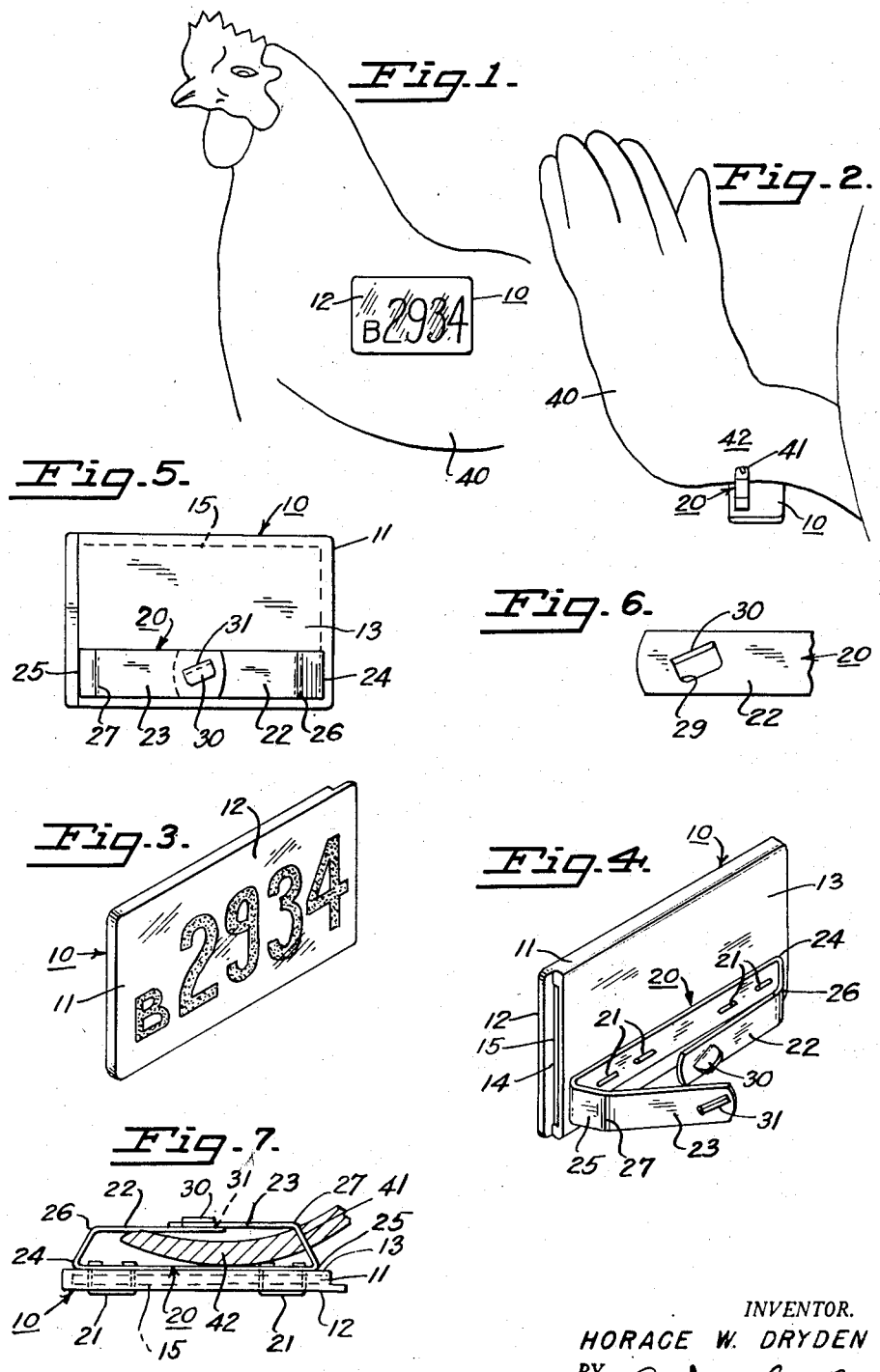
INVENTOR.
HORACE W. DRYDEN
BY
ATTORNEY Patented Oct. 6, 1953

2,654,169

UNITED STATES PATENT OFFICE 2,654,169

CHICKEN WING MARKER

Horace W. Dryden, Modesto, Calif.

Application October 16, 1948, Serial No. 54,870

2 Claims. (Cl. 40—3)

This invention relates to a method and apparatus for marking animals, including fowls. More particularly, it relates to identification apparatus and to a method of attaching the apparatus to a chicken so that it will stay attached for the life of the chicken.

Identification of fowls has been a great aid to modern poultry breeding. Definite identification, combined with breeding history and trapnest records of egg production made possible by identification, enables quick evaluation of individual hens and accurate and scientific culling of the flock.

The conventional method of marking a chicken is to encircle one of its legs with a numbered band. These leg bands, however, have many disadvantages. Special tools are required to attach them. The numerals on leg bands are, of necessity, small, and many costly breeding mistakes have resulted from the poor legibility of all types of leg bands. The embossed numerals on metallic bands are especially hard to read, and numerals applied to the surface of metal or plastic bands soon wear off. Further, from the standpoint of practical use, the leg is a poor location for the identification marker. Chickens run about getting their feet, legs, and leg bands coated with mud so that the numbers cannot be read until the bands are wiped off. Even when they have been wiped clean, they are difficult to read because of the distortion that occurs when the band is bent into a circular shape around the chicken's small leg. Moreover, all leg bands have the serious disadvantage that, in order to read them, the bird must be handled and this, in itself, is a time-consuming operation, especially on a large ranch where a thousand or more hens must be identified every day—mostly during a relatively short peak period of egg laying.

Another approach to the identification problem has been the use of a badge suspended from the neck or wing of the bird by harness of clip. These badges, if attached to a young chicken, uniformly have required adjustment or replacement as the chicken grows larger.

One type of harness-suspended badge is shown in U. S. Patent No. 1,475,906. It requires that the chicken be caught and the harness adjusted for size three times during the growing period. Furthermore, this marker lies on the back of the bird and is readable only from directly above the chicken.

The wing tip type of marker is shown in U. S. Patent No. 881,152. It is formed as an oblong loop which is slipped over the tip of the wing adjacent the body of the fowl. Such a clip is effectively attachable only to full grown birds. If the marker is to be used with young birds, small sized clips are required to fit the narrow scapula of its wing. During its growth, a bird bearing this type of encircling clip must be caught many times and reclipped with a wider-looped clip before the outgrown loops deform the wing. In addition, these identification clips have slipped off or have been thrown off when a strong bird flexes or beats its wings.

Other methods of attaching identification markers have been tried, but up to now, none has proved thoroughly satisfactory. In addition to the above-explained disadvantages, these markers have, in general, been too easily lost and too hard to read and have caused the bird nervous and physical harm.

One problem has been how to provide a large, conspicuous number held in a position so that it is easily readable without handling the bird and which, when once attached to a young fowl is attached for the life of the bird. A lifetime marker obviates recurring marking periods with their attendant work and their chances for mistakes.

It is an object of this invention to provide a fowl-marker which solves the above-mentioned problems.

Another object of this invention is to provide a fowl-marker which, when properly attached, will always hang in a vertical position where it can easily and accurately be read.

Another object of this invention is to provide a method of utilizing the structure of the bird so that a large marker can be quickly and safely applied to the bird in a more convenient location than heretofore.

Another object of this invention is to provide a method of attaching a fowl-marker to the bird which will hold it permanently in a position where it can be read without handling the bird.

Another object of this invention is to provide a method of attaching a fowl-marker to the wing of the bird.

Another object of this invention is to provide an identifying marker which will stay attached to the wing.

Still another object of this invention is to provide a fowl-marker which will not hurt the bird.

A further object of this invention is to provide an identifying fowl-marker which will speed up trap-nesting by reducing the time it takes to identify each bird.

Still a further object is to provide a marker which need never be changed during the growth of the chicken.

Other objects and advantages of the invention will appear from the following description. A specific embodiment is described in detail, in accordance with U. S. Revised Statutes, section 4888, but the claims are not intended to be limited to this specific embodiment.

In the drawings:

Fig. 1 is a view of a chicken with a marker of the type disclosed in this specification, shown as it appears on the bird when applied in accordance with the method herein disclosed;

Fig. 2 is a top view of an extended chicken wing, showing a badge clipped to the web of the wing, in accordance with the principles of this invention;

Fig. 3 is a perspective view looking at the front of a preferred type of marker;

Fig. 4 is a view in perspective, looking at the rear of the same marker, the fastening means being shown open so that its structure appears more clearly;

Fig. 5 is a back view in elevation of the marker;

Fig. 6 is a plan view of a portion of the locking strip; and

Fig. 7 is a view, partly in section, looking down on the marker and a portion of the wing of the fowl.

Essentially, the marker of this invention includes a badge, to the back section of which is attached a strip which may be passed through an incision in the wing of the bird and clipped by a novel catch to a second strip on the other end of the same strip. The strip is thus looped so that it will not hurt the bird. Also, the strip is so located on the badge that the badge will always hang vertically in the reading position.

The method of this invention comprises affixing a badge to a chicken by a strip. An incision is made in the web of the chicken wing. One side of the strip is passed through this incision while the other end of the strip is passed around the leading edge of the chicken wing. The strip is then locked together in a manner which will not harm the bird.

Referring now to the drawings, the fowl marker consists in a badge 10. The badge body portion is preferably a case 11 having a front wall 12 and a rear wall 13 formed with a recess 14 between them, adapted to receive a numbered card 15. If the case 11 is of plastic composition, the front wall 12 should preferably be transparent to enable reading of the card enclosed within the case. If a metallic or other non-transparent case is used, the front wall 12 should be formed with an opening or window, so that the number on the card remains visible when the card 15 is in the recess. In either event, the card 15 may be held in the recess 14 by friction against the case, or it may be stuck to the case 11 by a suitable adhesive or by stapling.

Rigidly attached to the rear wall 13 of the case 11 is a metallic strip 20. Preferably the strip is secured below and parallel to the central lengthwise axis of the rear wall, so that the body will naturally hang vertically. The metal employed is preferably aluminum or a similar light, bendable alloy. As shown in Figs. 4 and 6, the strip 20 is secured to the wall 13 by staples 21, though other means might be employed. The strip 20 is about twice as long as the case 11, and its arms 22 and 23 are bent back at approximately right angles 24 and 25 and again at 26 and 27, so that the arms 22 and 23 overlie each other adjacent their ends. This bending forms an open loop which supports without pressing against the chicken wing.

Adjacent its end the arm 22 of the strip 20 has a U-shaped cut 29 (see Fig. 6). The flap 30 which is defined by the cut 29 is bent up perpendicularly to provide a clip. The arm 23 is slotted at 31 to receive the clip 30, and when the clip 30 is inserted through the slot 31 and bent over, the arm 23 is held securely to the arm 22.

It is important that the badges be properly applied. Most breeders today band their pullets all at one time, and a good time to put the badges on is when the pullets are moved to the laying houses.

Preferably the left wing is used for the wing badges because this is the side of the bird most easily seen by right handed trapnesters. It is an advantage to have someone hold the bird, but the badges can also be easily applied by one person if the legs are held under the left shoulder. Preferably, the left wing 40 is turned over and a few feathers pulled from the underneath side of the wing web to expose the skin. Using a sharp pocket knife, a horizontal incision 41 about 3/8 of an inch in width is made through the web 42. It is very important that the incision be made as far as possible in the crotch of the web 42 without actually striking the bone or adjoining muscle. Preferably the incision will be about one and a half inches from the edge of the wing web. Occasionally the incision will cause a slight temporary bleeding, but this is avoided with a little practice. After the badge is put on a scab usually forms at the point of incision, which disappears in about two weeks' time, leaving a clean hole. In no case has the health or apparent comfort of the bird ever been affected by application of the badges.

The slotted end 23 of strip 20 is easily inserted from the underneath side of the wing, through the incision 41. After the strip has been placed through the incision in such a position that the number can be read right side up when the bird is standing, the two ends of the band should be brought together so that the clip 30 fits into this slot 31. Only a little practice is required to perform this operation very quickly. A pair of long nose or electrical pliers is then preferably used to bend over the clip 30. This is done in a tight and neat manner, so that there is no possibility of the badge falling off. At the same time, the strip 20 is not crimped or flattened down. It should fit loosely in the web 42, so as not to interfere in any way with the chicken.

This badge is durable, will not loosen, and is easily applied. The number will stay clean because it is off the ground. It is large and easily read, being visible on the bird as she walks around the pen, and it is instantly visible without any manipulation of the hen as she comes out of the trapnest. The badge will not catch on anything or interfere with mating. Above all, it improves the speed and accuracy of trapnesting and increases the efficiency of breeding work in general.

The experience of most poultry breeders has been that it is impossible to achieve satisfactory accuracy in trapnesting with any of the common leg bands. Even at official egg laying tests, many trapnesting mistakes have been made, a condition which has been a source of concern to both supervisors and entrants. A study of the matter has shown that both psychological and mechanical factors are responsible for the inaccuracy, but that the chief cause of these mistakes has been inability to see the leg band number clearly and quickly when the hen is removed from the nest.

With use of the wing badges, a large clear number is seen instantly as the hen steps out of the nest and it is not necessary to manipulate or handle the hen in any manner to read the number. The operation is made much easier on both the hen and the attendant, and the speed of trapnesting is greatly increased. With wire front nests the number, in fact, is seen while the hen is still in a sitting position and before the trapnest door is opened. Experience with this new badge has demonstrated that one man can trap from 30 to 50 per cent more hens than he could with leg bands, and he does the job a great deal more accurately.

I claim:

1. A fowl wing attachable identification marker comprising a relatively large badge member having a back wall and an elongated flat strip of bendable material having the intermediate portion thereof extending along the back wall adjacent an edge of said tag parallel therewith and being rigidly secured thereto, the strip in operative position of the tag being bent adjacent opposite ends of the tag to provide a wing incision penetrating end portion and a second end portion disposed externally of the leading edge of the wing, the said end portions being further bent at points laterally spaced from said back wall providing portions parallel with said back wall disposed within a portion of the wing, and readily connectible and disconnectible fastening means adjacent the extremities of said last named strip portions, the tag projecting upwardly from said strip when in said applied position.

2. A fowl marker including in combination a large flat badge member having a transparent plastic front wall, and a plastic back wall, said wall portions providing an interior closed recess, an identification card disposed in said recess and being readable through said front wall and an elongated flat strip of bendable material having the intermediate portion thereof extending along the back wall adjacent an edge thereof and being rigidly secured thereto, the strip in operative position of the badge member being bent adjacent opposite ends of the badge member to provide a wing incision penetrating end portion and a second end portion disposed externally of the leading edge of the wing, the said end portions being further bent at points laterally spaced from said back wall disposed within a portion of the wing, and readily connectible and disconnectible fastening means adjacent the extremities of said last named strip portions, the badge member projecting upwardly from said strip when in said applied position.

HORACE W. DRYDEN.

References Cited in the file of this patent

UNITED STATES PATENTS

| Number | Name | Date |
|---|---|---|
| 162,725 | Weil | Apr. 27, 1875 |
| 574,789 | Dodge | Jan. 5, 1897 |
| 834,587 | Moyer | Oct. 30, 1906 |
| 881,152 | Renshaw | Mar. 10, 1908 |
| 1,089,508 | Smith | Mar. 10, 1914 |
| 1,737,201 | Reimer | Nov. 26, 1929 |
| 2,201,139 | Ivey | May 21, 1940 |
| 2,360,815 | Mungen | Oct. 17, 1944 |

FOREIGN PATENTS

| Number | Country | Date |
|---|---|---|
| 14,651 | Great Britain | July 15, 1899 |
| 114,369 | Great Britain | Apr. 4, 1918 |
| 533,390 | Germany | Sept. 11, 1931 |
| 685,438 | France | Apr. 1, 1930 |